(12) United States Patent
Pfister et al.

(10) Patent No.: US 8,196,401 B2
(45) Date of Patent: Jun. 12, 2012

(54) HYDRAULIC SYSTEM FOR CONTROLLING A BELT-DRIVEN CONICAL-PULLEY TRANSMISSION

(75) Inventors: Jochen Pfister, Strasbourg (FR); Eric Müller, Kaiserslautern (DE); Roshan Willeke, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 780 days.

(21) Appl. No.: 12/315,180

(22) Filed: Nov. 29, 2008

(65) Prior Publication Data

US 2009/0145292 A1 Jun. 11, 2009

Related U.S. Application Data

(60) Provisional application No. 61/005,334, filed on Dec. 4, 2007.

(51) Int. Cl.
*F16H 61/662* (2006.01)
*F16H 45/02* (2006.01)
(52) U.S. Cl. ............................................. 60/456; 477/38
(58) Field of Classification Search ................ 60/456; 91/468; 477/38, 45
See application file for complete search history.

(56) References Cited

U.S. PATENT DOCUMENTS

| 4,152,947 | A * | 5/1979 | van Deursen et al. .......... 474/11 |
| 4,735,113 | A * | 4/1988 | Yamamuro et al. ............ 477/38 |
| 5,222,418 | A |  6/1993 | Murota ........................ 475/159 |
| 6,428,445 | B1 * | 8/2002 | Friedmann et al. ............ 477/44 |
| 6,520,881 | B1 * | 2/2003 | Long et al. .................... 475/119 |
| 2002/0004436 | A1 | 1/2002 | Vorndran ........................ 475/91 |

* cited by examiner

*Primary Examiner* — Thomas E Lazo
(74) *Attorney, Agent, or Firm* — Alfred J. Mangels

(57) ABSTRACT

A hydraulic system for controlling a belt-driven conical-pulley transmission. A pump draws a working medium from a working medium tank or through a cooler return valve from a cooler return line. The cooler return valve is a minimum pressure valve that holds closed a connection between the cooler return line and a pump inlet line through the cooler return valve, as long as the pressure in the cooler return line remains below a specified minimum pressure. The cooler return valve also opens the connection between the cooler return line and the pump inlet line through the cooler return valve as soon as the specified minimum pressure in the cooler return line is exceeded.

7 Claims, 2 Drawing Sheets

# HYDRAULIC SYSTEM FOR CONTROLLING A BELT-DRIVEN CONICAL-PULLEY TRANSMISSION

BACKGROUND OF THE INVENTION

The invention relates to a hydraulic system for controlling a belt-driven conical-pulley transmission, the hydraulic system including a pump that draws a working medium from a working medium tank or through a cooler return valve from a cooler return line.

An object of the present invention is to provide a hydraulic system for controlling a belt-driven conical-pulley transmission, the hydraulic system including a pump that draws a working medium from a working medium tank or through a cooler return valve from a cooler return line, whereby the suction performance of the pump is improved.

SUMMARY OF THE INVENTION

Briefly stated, in accordance with one aspect of the present invention, a hydraulic system is provided for controlling a belt-driven conical-pulley transmission. A pump draws a working medium from a working medium tank, or through a cooler return valve from a cooler return line. The cooler return valve is designed as a minimum pressure valve that maintains closed a connection between the cooler return line and a pump inlet line through the cooler return line, as long as the pressure in the cooler return line is below a specified minimum pressure. The connection between the cooler return line and the pump inlet line opens through the cooler return valve as soon as the specified minimum pressure in the cooler return line is exceeded. The cooler return line thus operates as an absolute pressure valve, and not as a differential pressure valve. That enables an unwanted aspiration of air from the cooler return line to be prevented in a simple manner. Furthermore, the backpressure of the control system can be lowered. The specified minimum pressure in the cooler return line is preferably about 1.8 bar.

A preferred exemplary embodiment of the hydraulic system is characterized in that the cooler return valve includes a valve spool with an effective area that is biased against a sealing edge when the valve spool is in a closed position. In the closed position, the connection between the cooler return line and the pump inlet line is closed by the valve spool.

Another preferred exemplary embodiment of the hydraulic system is characterized in that the valve spool is biased to its closed position by a closing spring. The closing spring is preferably a compression spring that exerts a biasing force on one end of the valve spool.

Another preferred exemplary embodiment of the hydraulic system is characterized in that the effective area is a conical seat surface. The conical seat brings about very good sealing relative to the pump.

Another preferred exemplary embodiment of the hydraulic system is characterized in that the valve spool has an return pressure effective area that is pressurized with the pressure from the cooler return line against a biasing force acting on the valve spool. The return pressure effective area is in direct or indirect contact with the working medium in the cooler return line.

Another preferred exemplary embodiment of the hydraulic system is characterized in that the return pressure effective area has a incremental area that is directly connected to the cooler return line. Preferably, the cooler return line is connected to the cooler return valve in such a way that the pressure from the cooler return line acts directly on the incremental area of the return pressure effective area.

Another preferred exemplary embodiment of the hydraulic system is characterized in that the incremental area is formed radially outwardly of the effective area. The incremental area is preferably provided outside of a valve housing sealing edge against which the conical seat surface comes to bear when the valve spool is in the closed position.

Another preferred exemplary embodiment of the hydraulic system is characterized in that the return pressure effective area has another incremental area that is connected to the cooler return line through an orifice plate. Through the orifice plate, the pressure from the cooler return line acts only indirectly on the other incremental area of the return pressure effective area.

Another preferred exemplary embodiment of the hydraulic system is characterized in that the orifice plate has a diameter of approximately 0.75 millimeter. That value has proven to be especially advantageous within the framework of the present invention.

Another preferred exemplary embodiment of the hydraulic system is characterized in that the valve spool has a suction pressure effective area that is pressurized with the pressure in the pump inlet line. The suction pressure effective area is preferably at the end of the valve spool opposite the closing spring.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
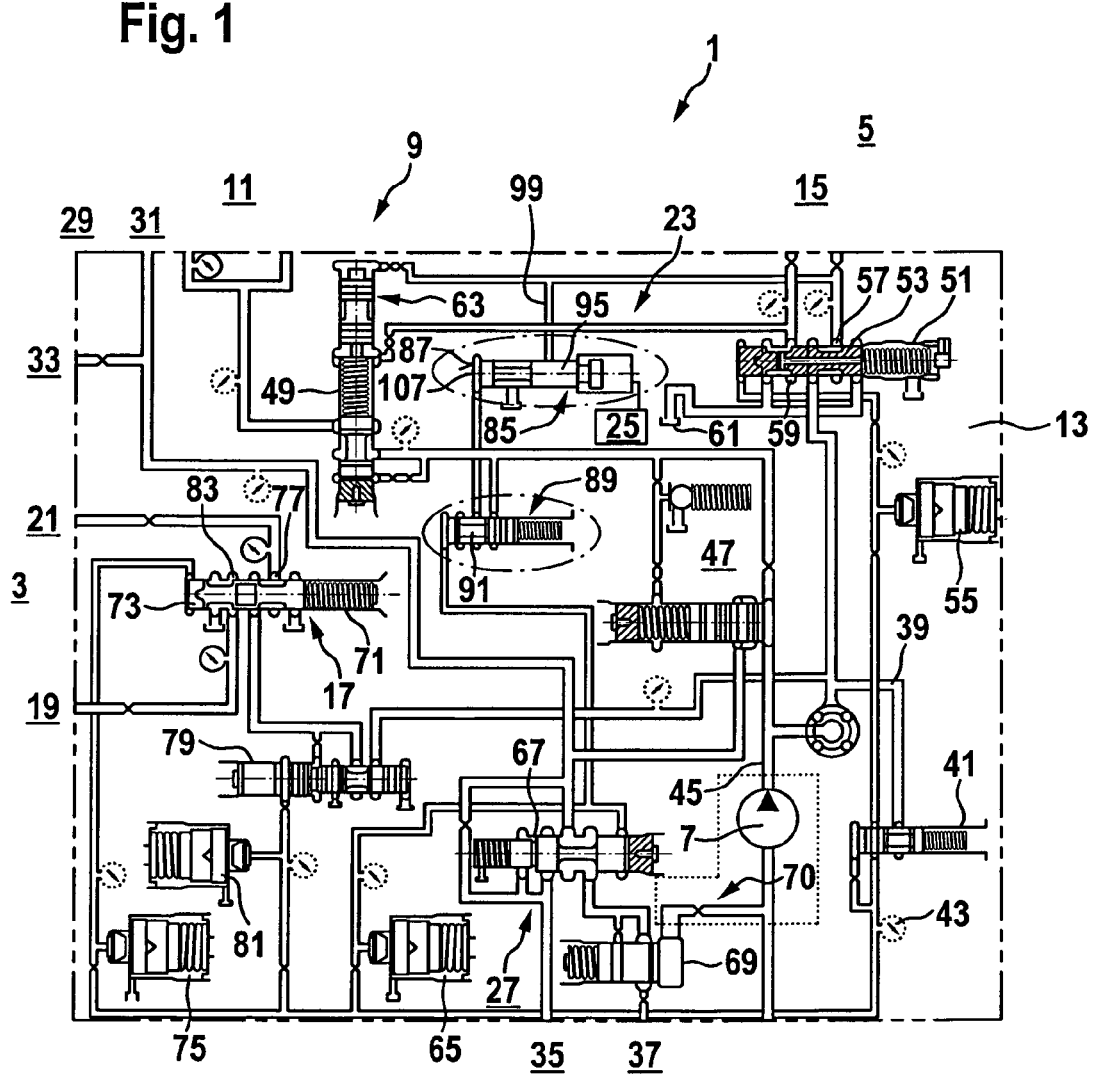
FIG. 1 is an embodiment of a hydraulic circuit diagram of a hydraulic system in accordance with the present invention for controlling a belt-driven conical-pulley transmission.

FIG. 1 is a circuit diagram of a portion of a hydraulic system 1. Hydraulic system 1 serves to control a belt-driven conical-pulley transmission, which is indicated in FIG. 1 by reference numeral 3. Belt-driven conical-pulley transmission 3 can be part of a drive train of a motor vehicle 5, which is indicated in FIG. 1 by reference numeral 5. Hydraulic system 1 has a hydraulic energy source 7, for example a mechanically or electrically driven hydraulic pump for delivering a hydraulic medium. For driving power, the hydraulic energy source 7 can be associated with an internal combustion engine (not shown) of motor vehicle 5. Hydraulic energy source 7 serves to supply hydraulic system 1 with hydraulic energy, Connected downstream from hydraulic energy source 7 is a first valve system 9, which is associated with a torque sensor 11. First valve system 1 and torque sensor 11 serve to provide and/or control a contact pressure to transmit torque between conical disk pairs and a corresponding torque transmitting component of belt-driven conical-pulley transmission 3, in particular as a function of the torque applied by belt-driven conical-pulley transmission 3. Upstream, torque sensor 11 is associated with a cooler return 31 through a cooler (not shown). Torque sensor 11 can raise or lower a system pressure 45 delivered by the hydraulic energy source by means of a suitable control edge and as a function of the applied torque.

Also connected downstream from hydraulic energy source 7 is a second valve system 13. Second valve system 13, indicated by reference numeral 15, is associated with conical disks of transmission 3 and serves to axially adjust the conical disks 15, i.e., to adjust the transmission ratio of belt-driven conical-pulley transmission 3.

Also connected downstream from hydraulic energy source 7 is a third valve system 17, which is associated with and actuates a forward clutch 19 and a reverse clutch 21.

Also connected downstream from hydraulic energy source 7 is hydraulic parking lock release system 23. Parking lock release system 23 of hydraulic system 1 is associated with a mechanical parking lock, indicated by reference numeral 25. The association can be accomplished by suitable mechanical aids, for example a lever. Parking lock release system 23 thus enables the mechanical parking lock 25 of motor vehicle 5 to be engaged, i.e., established, and released again.

Hydraulic energy source 7 also serves to supply a fourth valve system 27. Fourth valve system 27 serves to provide a volumetric flow of cooling oil that is provided by hydraulic energy source 7. To that end, fourth valve system 27 is associated with a cooling circuit indicated by reference numeral 29, in particular cooler return line 31, an active hydronic cooling system 33, a jet pump 35, and a centrifugal oil cover 37.

Hydraulic energy source 7 is associated downstream with a pilot pressure regulating valve 41 via a branch 39. Pilot pressure regulating valve 41 regulates a pilot pressure 43 of for example approximately 5 bar downstream, while hydraulic energy source 7 provides a higher system pressure 45. The pilot pressure serves in a known manner using suitable proportional valves, for example electrically actuatable proportional valves, to control the switching components of hydraulic system 1. To adjust and distribute the hydraulic energy delivered by hydraulic energy source 7, a fifth valve system 47 is provided. Fifth valve system 47 ensures priority supplying of torque sensor 11 and of second valve system 13, for example when starting the engine of motor vehicle 5.

For setting or regulating the system pressure 45 ahead of torque sensor 11, the latter has pressure regulating valves (not shown). The first valve system 9 has a system pressure valve 49 connected ahead of torque sensor 11. System pressure valve 49 is connected after the fifth valve system 47, and it allows an appropriate volumetric flow to pass to torque sensor 11, while the system pressure 45 downstream can be set to a minimum system pressure, for example 6 bar. To set the contact pressure through brief additional increases in the system pressure 45, system pressure valve 49 is additionally associated with the second valve system 13 through an upstream OR element 63.

Second valve system 13 has a seventh valve 51, with a seventh control spool 53, connected downstream from hydraulic energy source 7. Downstream, seventh valve spool 53 is associated with an eighth valve 55 for actuation. Eighth valve 55 can be a control valve, for example an electrically actuatable proportional valve. Seventh valve 51 has a first flow chamber or segment 57 and a second flow chamber or segment 59, which are associated, respectively, with corresponding adjusting elements of conical disks 15.

Using seventh control spool 53 of seventh valve 51, hydraulic energy source 7 can optionally be associated continuously, i.e., in a fluid transition, to first flow chamber or segment 57 or to second flow chamber or segment 59. Whichever flow chamber or segment is not associated with hydraulic energy source 7 can be associated correspondingly with the tank 61. In a middle position, both flow chambers or segments 57 and 59 can be disconnected from hydraulic energy source 7 and switched to tank 61. Thus, using seventh valve 51 of second valve system 13, a desired pressure ratio for shifting the conical disks 15 can be set in flow chambers or segments 57 and 59. In addition, flow chambers or segments 57 and 59 are associated through the OR element 63 of system pressure valve 49 to the latter. Through the association, the minimum system pressure set by means of system pressure valve 49 can be matched to seventh valve 51 when shifting movements are made by means of the latter, i.e., it can be raised, for example.

Fourth valve system 27 includes a cooling oil regulating valve 67 that is actuated by means of a fourth valve 65. Cooling oil regulating valve 67 is connected downstream from fifth valve system 47, and is supplied through the latter with hydraulic energy from hydraulic energy source 7. In addition, fourth valve system 27 includes a return valve 69, which is associated upstream directly to hydraulic energy source 7 or to a pump injector or a throttle back orifice 70 of hydraulic energy source 7. Downstream, return valve 69 is connected via a flow chamber or segment of return valve 69 and associated with centrifugal oil cover 37, and as volume flows increase it sends a branch flow directly into pump injector 70. Cooling oil regulating valve 67 serves to maintain and set a desired cooling oil volumetric flow to the components 31, 33, 35, and 37 that are to be cooled.

Third valve system 17 includes a first valve 71 with a first control spool 73. To actuate first control spool 73, it is associated downstream to a third valve 75, for example a control valve, for example an electrically actuatable proportional valve. First control spool 73 of first valve 71 can take essentially three selector positions to actuate forward clutch 19 and reverse clutch 21. In a first selector position, which is shown in FIG. 1, in which reverse clutch 21 is subjected to pressure, a first flow chamber or segment 77 of first valve 71 is associated by means of first control spool 73 with hydraulic energy source 7, with the association to hydraulic energy source 7 being accomplished by way of a fifth valve 79. Fifth valve 79 is actuatable by means of a sixth valve 81, for example a control valve, for example an electrically actuatable proportional valve, and serves to provide or control and/or regulate or engage the clutches 19 and 21 which are optionally connected downstream. If there is a torsional moment present to be transmitted, the pressure can be up to 20 bar for example. Advantageously, the fifth valve can be used, for example in the event of a malfunction, preferably in the case of a power failure, to switch the downstream first valve 71 to zero pressure, i.e., to separate hydraulic energy source 7 from first valve 71. Preferably, to that end both the inlet of first valve 71 and hydraulic energy source 7 can be switched to the tank 61.

In a second selector position, which corresponds to a displacement of the first control spool 73 of first valve 71 to the right, as viewed in FIG. 1, the connection to the upstream fifth valve 79 can be interrupted. Simultaneously, by means of the first control spool 73 of first valve 71 the first flow chamber or segment 77 can be switched to the tank 61, so that the reverse clutch is depressurized. Furthermore, in that selector position forward clutch 19 can also be switched to tank 61 through a second flow chamber or segment 83 of first valve 71.

In a third selector position, which corresponds to a further shift of control spool 71 to the right, as viewed in FIG. 1, second flow chamber or segment 83 can be associated with fifth valve 79 and first flow chamber or segment 77 with tank 61. In that third selector position, which corresponds to a selected forward gear of motor vehicle 5, forward clutch 19 is thus pressurized and reverse clutch 21 is switched to zero pressure.

The parking lock release system 23 includes a two-part parking lock cylinder 85. Parking lock cylinder 85 can be biased to the left, as viewed in FIG. 1, by means of a return spring (not shown) of parking lock 25. Parking lock cylinder 85 can be shifted to the right, as viewed in FIG. 1, against that biasing to release parking lock 25. To apply the corresponding hydraulic force, one face 87 of parking lock cylinder 85 is connected downstream from a second valve 89 of parking lock release system 23. To raise the system pressure 45 during the unlocking of parking lock 25, it is possible to simultaneously actuate the seventh valve 51 of second valve system 13 in any desired displacement direction, whereupon the system pressure 45 is raised through the downstream OR element and system pressure valve 49, for example to as much as 50 bar.

The second valve 89 of parking lock release system 23 is connected downstream from hydraulic energy source 7, with face 87 of parking lock cylinder 85 being directly associated with the system pressure 45 of hydraulic energy source 7 by means of a second control spool 91 of second valve 89. Second control spool 91 can be actuated by means of the fourth valve 65 of fourth valve system 27, with second control spool 91 being associated downstream with fourth valve 65. Thus, cooling oil regulating valve 67 and second valve 89 are controlled equally by fourth valve 65, while, for example, parking lock 25 can be released while the cooling oil volumetric flow is simultaneously turned on, and vice versa. It is also possible, however, to design the control surfaces and/or the directions of action of valves 67 and 89 differently, for example so that parking lock 25 is first unlocked, and when the pressure of fourth valve 65 is raised further the spool of cooling oil regulating valve 67 is also operated to activate the cooling. With that design it is thus possible to release parking lock 25 without simultaneously being compelled to activate the cooling.

Figure 2:
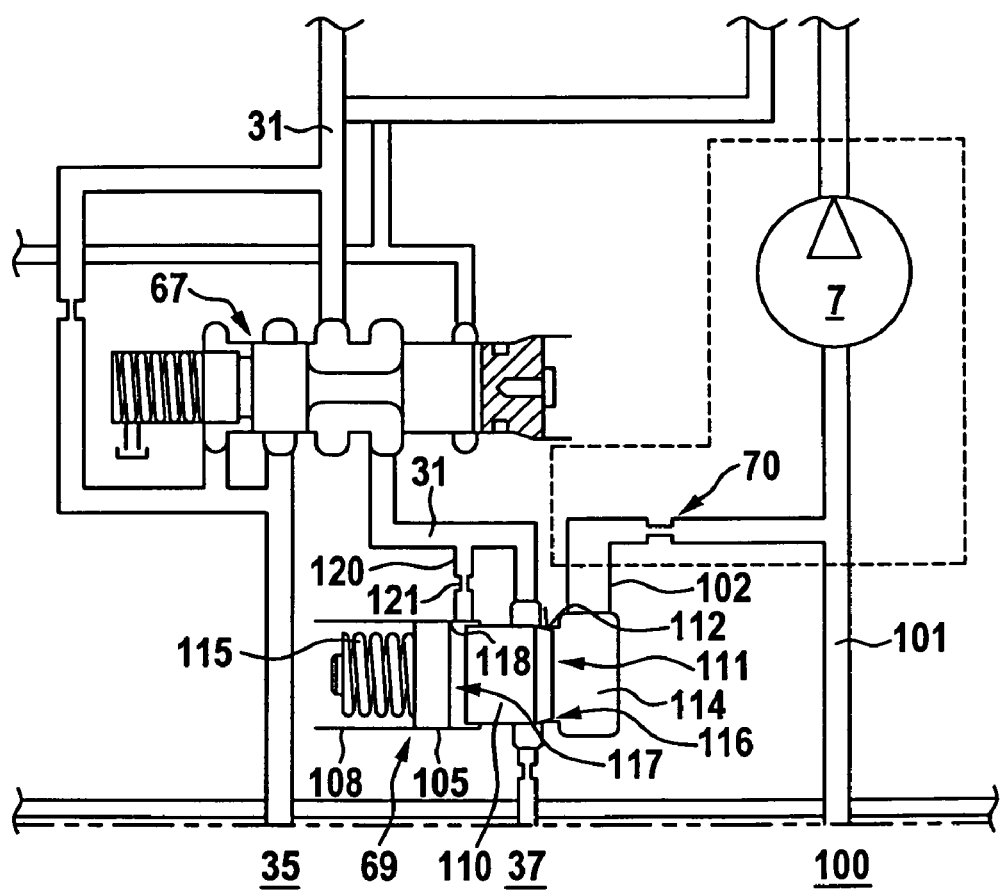
FIG. 2 is an enlarged detail of a portion of FIG. 1 showing a cooler return valve in accordance with the present invention.

FIG. 2 shows an enlarged detail return the return valve 69, which is also referred to as the cooler return valve. In the enlarged representation it can be seen that pump 7 draws the working medium from a tank 100. For that purpose, pump 7 is connected to tank 100 through a pump inlet line 101. Furthermore, pump 7 is connected to cooler return valve 69 through an additional pump inlet line 102. A pump injector 70, having an orifice plate or a throttle, is positioned in the additional pump inlet line 102. Additional pump inlet line 102 leads into pump inlet line 101.

In accordance with an essential aspect of the present invention, cooler return valve 69 is designed as a minimum pressure valve 105. Minimum pressure valve 105 includes a valve housing 108, in which a valve spool 110 is received so that it can move back and forth. Valve spool 110 has a suction pressure effective area 111 on one end surface, which bounds an inlet pressure chamber 114 in the valve housing 108. Additional pump inlet line 102 leads into inlet pressure chamber 114, so that the suction pressure effective area 111 is pressurized with the inlet pressure that is present in additional pump inlet line 102.

Suction pressure effective area 111 changes radially outwardly to an effective area 112, which is implemented in the present example as a conical seat surface. In FIG. 2 valve spool 110 is in its closed position, in which conical seat surface 112 bears against a sealing edge of valve housing 108. In the illustrated closed position of valve spool 110, a connection between cooler return line 31 and inlet pressure chamber 114 or additional pump inlet line 102 is interrupted or blocked or closed by valve spool 110. Valve spool 110 is biased into its closed position by a closing spring 115, which acts on the end surface of valve spool 110 that faces away from suction pressure effective area 111.

Also provided on valve spool 110 is an incremental area 116 of a return pressure effective area. In the present example, the incremental area 116 of the return pressure effective area is formed by an area of the conical seat surface 112 that is situated radially outwardly of the sealing edge that is provided on the valve housing 108. The incremental area 116 of the return pressure effective area is pressurized directly through cooler return line 31 with the return pressure that is present in cooler return line 31.

In addition to incremental area 116, the return pressure effective area includes another incremental area 117, which is provided on a shoulder 118 of valve spool 110. The additional incremental area 117, like incremental area 116, faces away from closing spring 115. The additional incremental area 117 is connected through a cooler return line 120, in which a throttle 121 is provided, only indirectly to cooler return line 31, i.e., through throttle 121.

In the initial state, in which the pressure in cooler return line 31 is zero bar or the ambient pressure, valve spool 110 closes the path or the connection from cooler return line 31 to pump inlet line 102 through conical seat 112. Conical seat 112 brings about a very good seal relative to the pump. In the closed position of valve spool 110, pump 7 draws the working medium only from tank 100.

When the pressure in cooler return line 31 rises, a force then acts on the return pressure effective area, which includes the two incremental areas 116, 117, which acts against the spring force of closing spring 115. The division of the return pressure effective area into the two incremental areas 116, 117, of which one is pressurized directly with the cooler return pressure and the other indirectly, provides the necessary damping of minimum pressure valve 105.

When the pressure acting on the return pressure areas 116, 117 exceeds a specified minimum pressure, for example 1.8 bar, then valve spool 110 moves in the direction of closing spring 115, i.e., to the left as viewed in FIG. 2, and in the region of conical seat 112 a cross section of the opening is released, so that working medium, in particular oil, flows from cooler return line 31 through additional pump inlet line 102 by way of pump injector 70 to pump 7. The corresponding position (not shown) of valve spool 110 is also designated as the open position.

The volumetric flow in the open position of valve spool 110 causes a suction pressure to build up in pump inlet line 102 at the pump injector 70, which suction pressure acts on the suction pressure effective area 111 of valve spool 110. At higher volumetric flows or pressures in inlet pressure chamber 114, that inlet pressure results in valve spool 110 moving further in the direction of closing spring 115, i.e., to the left as viewed in FIG. 2, against a corresponding stop. The stop can be achieved by closing spring 115 bottoming out.

A substantial advantage of the solution in accordance with the present invention consists in the simpler construction of the cooler return valve 69, and in the fact that the back pressure is kept lower, because cooler return valve 69 operates as an absolute pressure valve. Lowering that pressure, in turn, results in improved efficiency of the transmission as a whole. In particular, minimum pressure valve 105 prevents pump 7 from sucking in air from cooler return line 31 when the pressure in cooler return line 31 is low, which would significantly diminish the function of pump 7. Minimum pressure valve 105 ensures that a minimum pressure is always present. Minimum pressure valve 105 opens only when that minimum pressure is exceeded.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for controlling a belt-driven conical-pulley transmission, said hydraulic system comprising: a pump that draws a working medium from a working medium tank and through a cooler return valve from a cooler return line, wherein the cooler return valve is a minimum pressure valve that closes a connection through the cooler return valve between the cooler return line and a pump inlet line while a pressure in the cooler return line remains below a predetermined minimum pressure, and that opens the connection through the cooler return valve between the cooler return line and the pump inlet line through the cooler return valve when the predetermined minimum pressure in the cooler return line is exceeded, wherein the cooler return valve includes a valve spool movably received within a housing and having an effective end area that is biased against a sealing edge within the housing when the valve spool is in a closed position against the sealing edge, wherein the valve spool includes a return pressure effective area that is pressurized with a pressure from the cooler return line against a biasing force acting on the valve spool, wherein the return pressure effective area includes a first incremental area that is in fluid communication with the cooler return line.

2. A hydraulic system in accordance with claim 1, wherein the valve spool is biased to the closed position by a closing spring.

3. A hydraulic system in accordance with claim 1, wherein the effective end area is a conical seat surface.

4. A hydraulic system in accordance with claim 1, wherein the first incremental area is positioned radially outwardly at the effective end area.

5. A hydraulic system in accordance with claim 1, wherein the return pressure effective area includes a second incremental area that is in fluid communication with the cooler return line through an orifice plate.

6. A hydraulic system in accordance with claim 5, wherein the orifice plate has a diameter of about 0.75 millimeters.

7. A hydraulic system in accordance with claim 1, wherein the valve spool includes a suction pressure effective area that is pressurized with a pressure in the pump inlet line.

* * * * *